(12) United States Patent
Hintzer et al.

(10) Patent No.: US 9,453,086 B2
(45) Date of Patent: Sep. 27, 2016

(54) FLUOROPOLYMER COMPOSITIONS AND PURIFICATION METHODS THEREOF

(75) Inventors: Klaus Hintzer, Kastl (DE); Michael Juergens, Moenchengladbach (DE); Gunther J. Kaempf, Altoetting (DE); Harald Kaspar, Burgkirchen (DE); Kai H. Lochhaas, Neuotting (DE); Andre Streiter, Muehldorf am Inn (DE); Oleg Shyshkov, Burgkirchen (DE); Tilman C. Zipplies, Burghausen (DE); Herbert Koenigsmann, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 184 days.

(21) Appl. No.: 13/995,615

(22) PCT Filed: Dec. 21, 2011

(86) PCT No.: PCT/US2011/066456
§ 371 (c)(1),
(2), (4) Date: Jun. 19, 2013

(87) PCT Pub. No.: WO2012/088258
PCT Pub. Date: Jun. 28, 2012

(65) Prior Publication Data
US 2013/0281607 A1    Oct. 24, 2013

(30) Foreign Application Priority Data
Dec. 23, 2010    (GB) .................................. 1021790.9

(51) Int. Cl.
  *C08F 14/18*    (2006.01)
  *C02F 1/461*    (2006.01)
  *C02F 1/26*    (2006.01)
  *C08F 14/08*    (2006.01)

(52) U.S. Cl.
  CPC ................. *C08F 14/18* (2013.01); *C02F 1/26* (2013.01); *C02F 1/461* (2013.01); *C08F 14/08* (2013.01); *C02F 2001/46138* (2013.01); *C02F 2001/46147* (2013.01); *Y02P 20/582* (2015.11)

(58) Field of Classification Search
  CPC ...................................................... C02F 1/461
  See application file for complete search history.

(56) References Cited

U.S. PATENT DOCUMENTS

| 4,369,266 | A | 1/1983 | Kuhls |
| 5,364,508 | A | 11/1994 | Weres |
| 5,453,477 | A | 9/1995 | Oxenrider |
| 6,255,384 | B1 | 7/2001 | McCarthy |
| 6,315,886 | B1 | 11/2001 | Zappi |
| 2004/0132939 | A1 | 7/2004 | Kaspar |
| 2005/0096442 | A1 | 5/2005 | Thaler |
| 2006/0078800 | A1 | 4/2006 | Konabe |
| 2007/0015864 | A1 | 1/2007 | Hintzer |
| 2007/0025902 | A1 | 2/2007 | Hintzer |
| 2007/0276068 | A1 | 11/2007 | Hintzer |
| 2010/0084343 | A1 | 4/2010 | Mader |
| 2010/0179293 | A1* | 7/2010 | Hintzer et al. ................. 526/255 |
| 2010/0197852 | A1* | 8/2010 | Tsuda et al. .................... 524/544 |
| 2011/0040039 | A1* | 2/2011 | Palamone ............. C08F 259/08 525/199 |
| 2011/0247929 | A1* | 10/2011 | Nagai et al. ............. 204/290.15 |
| 2012/0055807 | A1 | 3/2012 | Fath |

FOREIGN PATENT DOCUMENTS

| DE | 102009013380 A1 * | 9/2010 |
| EP | 0 472 908 08 | 3/1992 |
| EP | 1452571 | 9/2004 |
| EP | 1939222 | 7/2008 |
| EP | 1942118 | 7/2008 |
| EP | 2058291 | 5/2009 |
| GB | 2430437 | 3/2007 |
| JP | 08-100022 | 4/1996 |
| WO | WO 02/088206 | 11/2002 |
| WO | WO 02-088207 | 11/2002 |
| WO | WO 2004/078836 | 9/2004 |
| WO | WO 2006-069104 | 6/2006 |

(Continued)

OTHER PUBLICATIONS

Carter et al. "Oxidative Destruction of Perfluorooctane Sulfonate Using Boron-Doped Diamond Film Electrodes", Environ. Sci. Technol. 2008, 42, 6111-6115.*
Lissens, G., "Electrochemical degradation of surfactants by intermediates of water discharge at carbon based electrodes", *Electrochimica Acta*, vol., 48, p. 1655-1663 (2003).
Cheng, "Sonochemical Degradation of Perfluorooctane Sulfonate (PFOS) and Perfluoroctanoate (PFOA) in Groundwater: Kinetic Effects of Matrix Inorganics", Environmental Science Technology, Jan. 2010, vol. 44, No. 1, pp. 445-450.
Hori, "Photocatalytic decomposition of a perfluoroether carboxylic acid by tungstic heteropolyacids in water", Applied Catalysis B: Environmental, Jul. 2008, vol. 82, No. 12, pp. 58-66.
Wang, "Electrochemical degradation of 4-chlorophenol using a novel Pd/C gas-diffusion electrode", Applied Catalysis B: Environmental, Nov. 2007, vol. 77, No. 1, pp. 58-65.

(Continued)

*Primary Examiner* — Nicole M Buie-Hatcher
(74) *Attorney, Agent, or Firm* — Julie Lapos-Kuchar

(57) ABSTRACT

Described herein is a composition comprising an aqueous polymerization reaction product of fluorinated monomers and wherein the polymerization is initiated (i) in the absence of a fluorinated emulsifier and whereby no fluorinated emulsifier is added during polymerization or (ii) in the presence of an fluorinated emulsifier selected from: $[R_f—O-L-COO-]_i\ X^{i+}$ (I) wherein L represents a linear or branched, non-fluorinated, partially fluorinated, or fully fluorinated alkylene group, $R_f$ represents a linear or branched partially or fully fluorinated aliphatic group or a linear or branched partially or fully fluorinated aliphatic group interrupted with at least one oxygen atom, $X^{i+}$ represents a cation having the valence i and i is 1, 2 or 3; wherein the reaction product and/or the resulting aqueous phase are substantially free of di- and tri-alkylamines and substantially free of low molecular weight fluoroorganic compounds and methods thereof.

20 Claims, 1 Drawing Sheet

(56) References Cited

FOREIGN PATENT DOCUMENTS

| WO | WO 2007-011633 | 1/2007 |
| WO | WO 2008-076746 | 6/2008 |
| WO | WO 2009-049168 | 4/2009 |
| WO | WO 2010035448 A1 * | 4/2010 |
| WO | WO 2010/075359 | 7/2010 |
| WO | WO 2011-018514 | 2/2011 |

OTHER PUBLICATIONS

International Search Report for PCT International Application No. PCT/US2011/066456, Mailed Mar. 2, 2012, 4 pages.

Schroder, "Biological wastewater treatment followed by physicochemical treatment for the removal of fluorinated surfactants", *Water Science & Technology*, 2010, vol. 61, No. 12, pp. 3208-3215.

* cited by examiner

US 9,453,086 B2

FLUOROPOLYMER COMPOSITIONS AND PURIFICATION METHODS THEREOF

TECHNICAL FIELD

A fluorinated composition substantially free of di- and tri-alkyl amines and substantially free of low molecular weight fluoroorganic compounds and a method thereof is described.

BACKGROUND

Fluorinated compositions have been used in a wide variety of applications including fluorochemicals for: waterproofing materials, fire-fighting foams for electrical and grease fires, semi-conductor etching, and lubricants; and fluoropolymers for: hoses, gaskets, seals, coatings, and films. Reasons for such widespread use of fluorinated compositions include their favorable physical properties, which include chemical inertness, low coefficients of friction, and low polarizabilities (i.e., fluorophilicity).

After production of a fluorinated composition, fluorinated compounds, including, for example, starting materials and reaction by-products, may be removed from the fluorinated composition. The removal of the fluorinated compounds may be to recover expensive starting material, to isolate valuable reaction products, to remove by-products, to prevent release into the environment, to achieve other desired composition modifications and/or enable reaction components, like water, to be purified for reuse or recycling.

U.S. Publ. No. 2010/0084343 (Mader et al.) discloses removal of fluorinated compounds from water by using ion exchange resin comprising quaternary amines, while U.S. Pat. No. 4,369,266 (Kuhls, et al.) discloses collecting the fluorinated compounds using an anion exchanger and concentrating them using reverse osmosis to recycle them back into the process. However, these processes utilize an ion exchange resin, which can introduce amines into the composition. Furthermore, these processes are directed to removal or removal and concentration of the targeted undesired components. If the undesired compounds are not isolated or reused in the process they may be directed to an additional treatment facility or to a disposal facility where they may be disposed of by incineration, for example.

Figure 1:
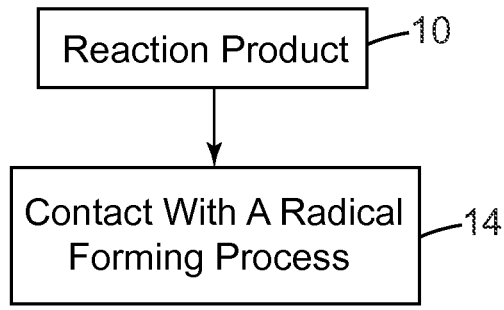
FIG. 1 is an exemplary process according to the present disclosure.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

SUMMARY

There is a desire to eliminate low molecular weight components from reaction products and water streams. From cost perspective, there is also a desire to reuse process water streams.

The present disclosure is a total treatment system, wherein the low molecular weight fluoroorganic compounds are not only removed from the desired fluorinated composition, but, may also be decomposed into their constituent species such as carbon dioxide, fluoride ion and simple sulfates.

In one aspect, a composition is described comprising: an aqueous polymerization reaction product of fluorinated monomers and wherein the polymerization is initiated (i) in the absence of a fluorinated emulsifier and whereby no fluorinated emulsifier is added during polymerization or (ii) in the presence of an fluorinated emulsifier selected from:

wherein L represents a linear or branched, non-fluorinated, partially fluorinated, or fully fluorinated alkylene group, $R_f$ represents a linear or branched partially or fully fluorinated aliphatic group or a linear or branched partially or fully fluorinated aliphatic group interrupted with at least one oxygen atom, $X^{i+}$ represents a cation having the valence i and i is 1, 2 or 3; wherein the reaction product and/or the resulting aqueous phase are substantially free of di- and tri-alkylamines and substantially free of low molecular weight fluoroorganic compounds.

In one embodiment, the aqueous polymerization reaction product is a coagulated polymer.

In another aspect, a method of purifying a reaction product is described comprising the following steps:

(i) providing a crude product comprising at least one low molecular weight fluoroorganic compounds wherein the low molecular weight fluoroorganic compounds is fluorinated and comprises a polar group and/or a reactive group;

(ii) extracting the low molecular weight fluoroorganic compound from the product using water to form an extract, (iii) contacting the extract with a radical-forming process to degrade the low molecular weight fluoroorganic compounds into carbon dioxide, water, fluorine ions, and optionally cations;

(iv) optionally, removing the fluorine ions and cations; and (v) optionally using the water from step (iii) in step (ii).

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed to the purification of a reaction product made from fluorinated compounds, wherein the purified reaction product is substantially free of low molecular weight fluoroorganic compounds and substantially free of di- and tri-alkylamines. In the present disclosure, a radical-forming process is used to degrade low molecular weight compounds into smaller fragments and finally into constituent species such as carbon dioxide, fluoride ions, and cations.

The process for purification may be further understood by reference to the figures.

Shown in FIG. 1 is a flow chart illustrating one embodiment of the present disclosure. Reaction product 10 is contacted with radical-forming process 14. Because the radical-forming process is dependent on chain length and/or composition, the fluoroorganic compounds comprising a smaller molecular weight and/or more hydrogen atoms will be degraded into their constituent species more quickly than the higher molecular weight compounds (e.g. such as semi-crystalline fluoropolymers) and their highly fluorinated counterparts. For example, when the reaction product is an aqueous dispersion comprising fluoropolymer latices (i.e., high molecular weight polymers) and low molecular weight fluorinated compounds (such as starting materials), it is believed that the low molecular weight fluoroorganic compounds will degrade before the fluoropolymer latices when exposed to the radical-forming process. Thus, the resulting treated reaction product may be substantially free of low molecular weight fluoroorganic compounds. In the case of a fluoropolymer dispersion, the reaction product may be coagulated after contact with the radical-forming process to obtain a coagulated fluoropolymer. Because the reaction product (e.g., a coagulated fluoropolymer) has not been exposed to an anion exchange resin, the reaction product may be substantially free of di- and tri-alkyl amines and may have improved processing and final performance characteristics.

Figure 2:
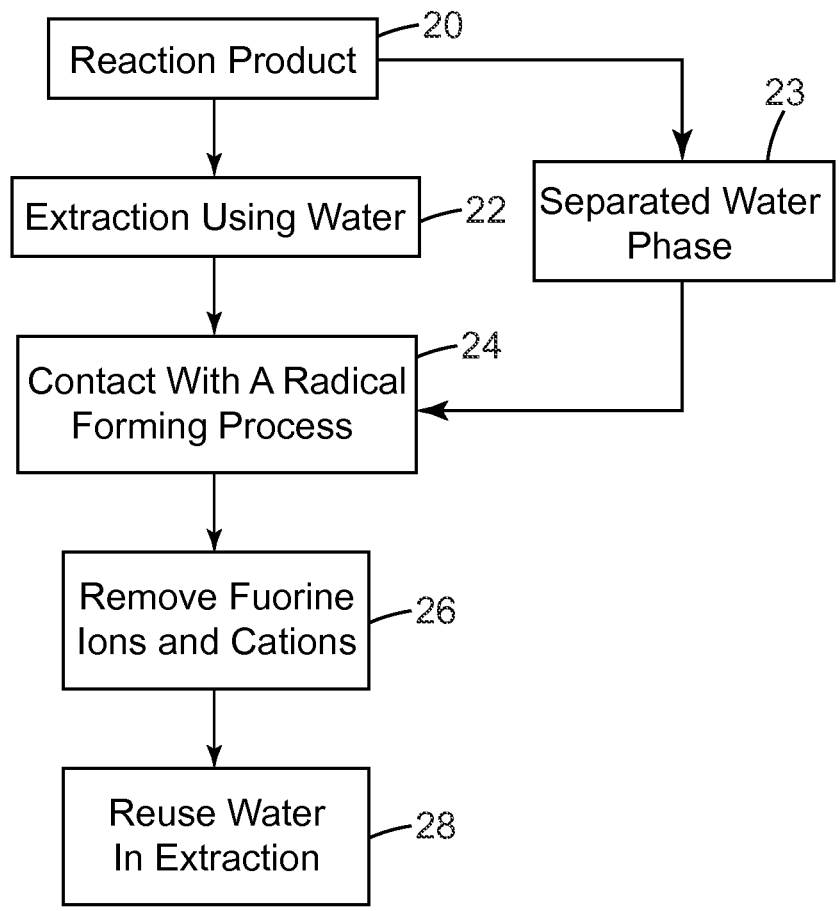
FIG. 2 is another exemplary process according to the present disclosure.

In one embodiment, the desired reaction product is separated from an aqueous phase (e.g., in an aqueous polymerization process, which is then coagulated) or the reaction product is extracted with water to form an aqueous phase. See for example, FIG. 2, which is flowchart chart illustrating another embodiment of the present disclosure. In FIG. 2, reaction product 20 may be separated into the desired reaction product and a separated aqueous phase (or water phase) 23, such as when the reaction product is an aqueous fluoropolymer dispersion and the dispersion is coagulated forming a coagulated fluoropolymer and an aqueous phase. Alternatively, the reaction product 20 may be extracted using water 22 forming an aqueous phase. The undesirable, low molecular fluorinated compounds should be preferentially extracted into the aqueous phase, thus, purifying the desired reaction product. The aqueous phase is then contacted with a radical-forming process 24, which will cause the fluoroorganic components to be converted into constituent species. Optionally, the ions, e.g., fluorine ions and cations, may be removed from the treated aqueous phase 26, resulting in purified water. Optionally, this water may be reused as a starting material to form the reaction product or in extraction step 22.

In one embodiment, as is known in the art, additional stabilizers such as non-fluorinated emulsifiers may be added to stabilize the fluoropolymer dispersion and prevent premature coagulation upon the removal of the fluorinated emulsifiers.

Radical-Forming Process

In the present disclosure, the radical-forming process refers to a process which generates radicals, specifically hydroxy radicals. Such a process for generating radicals is the electrochemical generation of radicals, which react with the fluorinated compounds resulting in the constituent species of water, carbon dioxide and fluorine ions, among others.

The electrochemical generation of radicals is accomplished using specific electrodes, such as doped diamond coated electrodes, doped diamond particle electrodes, lead oxide electrodes, or combinations thereof.

Typically these electrodes comprise a metal (such as Nb, Ti, Zr, and/or Ta), graphite, and/or ceramic base material (such as SiC and/or SiN with sufficient conductivity), which is coated with a doped diamond. Usually these electrodes are coated by chemical vapour deposition and are sometimes referred to as (thin) layer diamond-electrodes.

The resistivity of the doped diamond layer is between 0.001 to 10 Ωcm (Ohm centimeters). By doping diamond with boron, phosphorous, nitrogen, and/or sulphur the diamond becomes semiconductive. Preferably, boron or nitrogen is used to dope the diamond coated electrode. The content of boron is between about 0.05 ppm (parts per million) to 10000 ppm, preferably between about 0.1 ppm to 100 ppm. The content of nitrogen is between about 5 ppm to 100 ppm.

Exemplary boron doped diamond coated electrodes are commercially available from: Adamont Technologies SA, La-Chaux-deFonds (CH), Condias GmbH, Itzehoe (Germany), DiaCCon GmbH, Erlangen (Germany), Element Six Ltd. (GB), and Pro Aqua GmbH, Niklasdorf (Austria).

The electrodes of the present disclosure are able to produce hydroxyl radicals (instead of $H_2+O_2$). Such electrodes are also called "high oxygen overvoltage anodes". It is believed that the hydroxyl radicals react with the compounds within the composition, causing decomposition.

The electrochemical cell can be assembled as in known in the art. The doped diamond electrode or lead oxide electrode may be the anode or the cathode, but is typically the anode.

The electrochemical process is operated under continuous conditions. Usually the aqueous phase is run through a pair of electrodes (preferably the anode is the anode oxidation place). In one embodiment, more than one electrode pair is used in an electrochemical cell. The cell can be monopolar or bipolar, with or without a diaphragm. In one embodiment, ion selective membranes may be used. Exemplary cell designs are described in detail in U.S. Pat. No. 6,315,886 (Zappi et al.).

In one embodiment, the voltage during the radical forming process is at least 2, 3, 3.5 or even 4 volts and no more than 8, 10, 15 or even 20 volts.

It is believed that the current density is not critical, however, usual current densities are at least 0.5, 1 or even 2 $A/dm^2$ (Amps per decimeter squared) and at least 6, 8, or even 10 $A/dm^2$.

In one embodiment, the temperature during the radical forming process is between 5° C. to 95° C., and preferably at least 30° C.

In order to achieve satisfactory current, the conductivity of the aqueous solutions to be contacted with the radical forming process should be at least 200 µS/cm, preferably at least 500 µS/cm.

Anions such as sulfate anions ($SO_4^{2-}$) which are either present in, or added to, the aqueous solutions to be contacted with the radical forming process may enhance the conductivity of the solution. Typical amounts of the sulphate ion are at least 0.01, 0.05, 0.1, 1, or even 5 g/L; at most 50, 100, 150, or even 200 g/L.

In one embodiment, the aqueous solutions may be diluted and/or anions added to assist in the electrolyzation process to remove low molecular weight fluoroorganic compounds.

For example, if the aqueous solutions comprise polymer particles, these solutions may be more difficult to electrolyze due to a reduction in the electrical conductivity, which can make the removal of low molecular weight species by electrolysis difficult. Diluting the aqueous solutions and/or adding anions (such as $SO_4^{2-}$) to the aqueous solutions may improve the electrical conductivity and achieve more efficient removal of the of low molecular weight fluoroorganic compounds. In one embodiment, it has been found that aqueous solutions comprising at least 0.0001 wt % polymer particles can be purified with the present method.

Reaction Product

The present disclosure provides a method for the disposal of low molecular weight fluoroorganic compounds by contacting an aqueous composition to a radical forming process. In one embodiment, the reaction product is an aqueous polymerization reaction product of fluorinated monomers. Such a reaction product may be a fluoropolymer latex or a coagulated fluoropolymer (i.e., fluoropolymer particles separated from the aqueous medium (e.g. by up-concentration)). In another embodiment, the reaction product is a fluorinated compound synthesis. These reaction products are described in more detail below.

In the preparation of fluoropolymers, fluorinated monomers are polymerized in the presence of an initiator. In aqueous polymerization, optionally a fluorinated emulsifier is used.

In the present disclosure, the fluorinated monomer is a fluorinated olefin. Examples of fluorinated olefins include tetrafluoroethylene, chlorotrifluoroethylene, hexafluoropropylene and vinylidene fluoride. According to a particular embodiment of the present disclosure, the aqueous polymerization involves a copolymerization of one or more fluorinated olefins with optionally one or more fluorinated or non-fluorinated comonomers. Examples of comonomers include perfluoroalkyl vinyl monomers, ethylene, propylene, fluorinated allyl ethers, in particular perfluorinated allyl ethers and fluorinated vinyl ethers, in particular perfluorovinyl ethers. Further fluorinated and non-fluorinated monomers can be included as well.

Examples of fluorinated comonomers that may be used in the aqueous emulsion polymerization according to the invention include those corresponding to the formula:

$$CF_2=CF-O-R_f \quad (I)$$

wherein $R_f$ represents a fluorinated aliphatic group that may contain one or more oxygen atoms. Preferably, the fluorovinyl ethers correspond to the general formula:

$$CF_2=CFO(R_fO)_n(R'_fO)_mR''_f \quad (II)$$

wherein $R_f$ and $R'_f$ are different linear or branched fluoroalkylene groups of 2-6 carbon atoms, m and n are independently 0-10, and $R''_f$ is a fluoroalkyl group of 1-6 carbon atoms. Examples of fluorovinyl ethers according to the above formulas include perfluoro-2-propoxypropylvinyl ether (PPVE-2), perfluoro-3-methoxy-n-propylvinyl ether, perfluoro-2-methoxy-ethylvinyl ether, perfluoromethylvinyl ether (PMVE), perfluoro-n-propylvinyl ether (PPVE-1) and $CF_3-(CF_2)_2-O-CF(CF_3)-CF_2-O-CF(CF_3)-CF_2-O-CF=CF_2$.

Still further, the polymerization may involve comonomers that have a functional group such as for example a group capable of participating in a peroxide cure reaction. Such functional groups include halogens such as Br or I as well as nitrile groups. Specific examples of such comonomers that may be listed here include:

(a) bromo- or iodo-(per)fluoroalkyl-(per)fluorovinylethers having the formula:

$$Z-R_f-O-CX=CX_2$$

wherein each X may be the same or different and represents H or F, Z is Br or I, $R_f$ is a (per)fluoroalkylene $C_1$-$C_{12}$, optionally containing chlorine and/or ether oxygen atoms; for example: $BrCF_2-O-CF=CF_2$, $BrCF_2CF_2-O-CF=CF_2$, $BrCF_2CF_2CF_2-O-CF=CF_2$, $CF_3CFBrCF_2-O-CF=CF_2$, and the like; and (b) bromo- or iodo containing fluoroolefins such as those having the formula:

$$Z'-(R'_f)_r-CX=CX_2,$$

wherein each X independently represents H or F, Z' is Br or I, $R'_f$ is a fluoroalkylene $C_1$-$C_{12}$, optionally containing chlorine atoms and r is 0 or 1; for instance: bromotrifluoroethylene, 4-bromo-perfluorobutene-1, and the like; bromofluoroolefins such as 1-bromo-2,2-difluoroethylene and 4-bromo-3,3,4,4-tetrafluorobutene-1; or iodofluoroolefins such as 1-iodo-2,2-difluoro ethylene and 4-iodo-3,3,4,4-tetrafluorobutene-1.

Examples of nitrile containing monomers that may be used include those that correspond to one of the following formulas:

$$CF_2=CF-CF_2-O-R_f-CN$$

$$CF_2=CFO(CF_2)_LCN$$

$$CF_2=CFO[CF_2CF(CF_3)O]_g(CF_2)_vOCF(CF_3)CN$$

$$CF_2=CF[OCF_2CF(CF_3)]_kO(CF_2)_uCN$$

wherein L represents an integer of 2 to 12; g represents an integer of 0 to 4; k represents 1 or 2; v represents an integer of 0 to 6; u represents an integer of 1 to 6, $R_f$ is a fluoroalkylene or a bivalent fluoroether group. Specific examples of nitrile containing liquid fluorinated monomers include perfluoro(8-cyano-5-methyl-3,6-dioxa-1-octene), $CF_2=CFO(CF_2)_5CN$, and $CF_2=CFO(CF_2)_3OCF(CF_3)CN$.

In one embodiment, the fluorinated monomer is selected from: tetrafluoroethylene, hexafluoropropylene, vinylidene fluoride, perfluorinated alkyl vinyl ether, perfluorinated alkoxyalkyl vinyl ether, perfluorinated alkenyl vinyl ether, or perfluorinated alkoxyalkenyl vinyl ether, $CF_2=CFOCF_2(CF_2)_3CF_2CN$, $CF_2=CFOCF_2CF(CF_3)OCF_2CF_2CN$, $CF_2=CFOCF_2CF_2Br$, $CF_2=CFOCF_2CF_2CF_2Br$, and $CF_2=CFOCF_2CF_2CF_2OCF_2CF_2Br$ In one embodiment, the polymerization is substantially free of a traditional fluorinated emulsifier. In other words, the polymerization comprises less than 500, 250, 100, 10 or even 0.1 ppm of a traditional fluorinated emulsifier, such a fully or partially fluorinated carboxylic acid. In other words, the aqueous emulsion polymerization is carried out without the addition of a fluorinated emulsifier. That is, the polymerization is initiated or started without the presence of a fluorinated emulsifier and fluorinated emulsifier is not added during the polymerization. Such polymerizations are disclosed in U.S. Pat. Nos. 5,453,477 (Oxenrider et al.) and 6,255,384 (McCarthy et al.). According to the emulsifier free aqueous emulsion polymerization disclosed in U.S. Pat. No. 6,255,384, a radical initiator system of a reducing agent and oxidizing agent is used to initiate the polymerization and the initiator system is added in one or more further charges during the polymerization. Suitable oxidizing agents that can be used include persulfates such as potassium sulfate and ammonium sulfate, peroxides such as hydrogen peroxide, potassium peroxide, ammonium peroxide, tertiary butyl hydroperoxide, cumene peroxide and t-amyl hydroperoxide, manganese triacetate, potassium permanganate, ascorbic acid and mixtures thereof. Suitable reducing agents include sodium sulfites such as sodium bisulfite, sodium sulfite, sodium pyrosulfite, sodium-m-bitsulfite, ammonium sulfite monohydrate and sodium thiosulphate, hydroxylamine, hydrazine, ferrous iron, organic acids such as oxalic acid and citric acid and mixtures thereof.

Alternatively, the emulsifier free aqueous polymerization may involve an initial charge of an oxidizing agent and/or a reducing agent and one or more further charges of either the reducing agent or oxidizing agent, but not both, in the course of the polymerization. Polymerization made by this process may have the advantage that the aqueous polymerization process can be conducted in an easy and convenient way while still yielding stable polymer dispersions at a high rate and in good yield.

In another embodiment of the present disclosure, an emulsifier is used to aid the dispersion. The emulsifiers of the present disclosure may be partially fluorinated or fully fluorinated.

In one embodiment, the fluorinated emulsifier is selected from a sulphonic acid and/or a carboxylic acid, such as: $C_8F_{17}SO_3X$, $C_7F_{15}CO_2X$, or $C_8F_{17}SO_2N(C_2H_5)$ $CH_2COOX$, wherein X is a cation, such as $Ca^{+2}$, $K^+$, $Na^+$, $NH_4^+$, and $Mg^{+2}$.

In another embodiment, the fluorinated emulsifier is selected from:

$$[R_f\text{—O-L-COO}^-]_i X^{i+} \qquad (III)$$

wherein L represents a linear or branched, non-fluorinated, partially fluorinated, or fully fluorinated alkylene group, $R_f$ represents a linear or branched partially or fully fluorinated aliphatic group or a linear or branched partially or fully fluorinated aliphatic group interrupted with at least one oxygen atom, $X^{i+}$ represents a cation having the valence i and i is 1, 2 or 3. Exemplary fluorinated emulsifiers include: $CF_3O(CF_2)_{1-4}OCFHCF_2COOX$; $HCF_2O(CF_2)_{1-4}OCHFCF_2$—COOX, $CF_3CFHO(CF_2)_{1-4}OCHFCF_2COOX$, $C_3F_7OCF(CF_3)COOX$, $CF_3O(CF_2)_3OCF_2COOX$; $F(CF_2)_nO(CF_2CF_2O)_mCF_2COOX$ wherein n is 1 to 5 and m is 0 to 5; and wherein X is a cation. Exemplary cations include: $Ca^{+2}$, $Na^+$, $NH_4^+$, and $Mg^{+2}$. Other specific examples include emulsifiers according to formula (III) wherein L is a branched fluorinated alkylene group, preferably containing one or more —$CF_3$ branches.

The aqueous polymerization is performed using techniques known to those of ordinary skill in the art. In one embodiment, the resulting fluoropolymer latex comprising a solid content of at least 0.0001, 0.001, 0.01, 0.1, 0.5, 1, 2, 5 or even 10% by weight. In one embodiment, the resulting fluoropolymer latex comprising a solid content of no more than 25, 30, 40, 50, 60, 70, or even 75% by weight.

Exemplary fluoropolymer latices may include: semi-crystalline homofluoropolymers, such as polytetrafluoroethylene, polyvinylidene fluoride, polychlorotrifluoroethylene; semi-crystalline fluorothermoplasts having melting points from 60° C. to 330° C. or even 100° C. to 320° C., such as a copolymer of tetrafluoroethylene and perfluoroalkoxyvinyl ether (PFA), copolymers of tetrafluoroethylene-hexafluoropropylene (FEP), copolymers of tetrafluoroethylene-hexafluoropropylene-vinylidene fluoride, copolymers of ethylene-tetrafluoroethylene and fluoropolymers with functional groups (such as those used for fuel cell applications); amorphous fluoropolymers, which can be cured to make fluoroelastomers, such as copolymers of tetrafluoroethylene-hexafluoropropylene-vinylidene fluoride; and combinations thereof.

In another embodiment, the reaction product may be a product resulting from a classical organic synthesis (e.g., a compound with a molecular weight lower than 5000 g/mol). Types of such synthesis include e.g. electrochemical or direct fluorination and oligomerizations of hexafluoropropylene oxide, vinyl-/allylether synthesis, and the making of Br, I, and CN-containing olefins and fluorinated compounds. Usually, the reaction mixture from such fluorinated organic syntheses contains acids, such as HF, bases, and ketones as side products.

Low Molecular Weight Fluoroorganic Compounds

Using the radical-generating process as disclosed herein, compounds having a polar or reactive group may be selectively converted into constituent species. Such polar groups or reactive groups may be selected from at least one of: an ether, an ester, an acid, and an olefin comprising halogens (such as $CX_2=CX—R_F$, where X is independently selected from H or F and $R_F$ is a fluorinated alkyl group; $CH_2=CH—(CF_2)_nF$ where n is 0 to 10; or hexafluoroisobutene). These low molecular weight fluoroorganic compounds may be partially fluorinated or fully fluorinated.

Because low molecular weight fluoroorganic compounds may be present in the polymerization of fluoropolymers or in the synthesis of fluorinated compounds, the present disclosure is particularly well suited for the removal of these low molecular weight fluoroorganic compounds. These low molecular weight fluoroorganic compounds may include for example, starting materials (such as monomers or emulsifiers, if added) or side reaction products.

Fluoroorganic compounds suitable for degradation include: acids such as $R_F$—COO$^-$ and $R_F$—SO$_3^-$ wherein $R_F$ is a fluorinated alkyl chain with or without heteroatoms, optionally containing further functional groups preferably Rf is a branched alkyl chain, more preferably a branched alkyl chain having at least one —$CF_3$ branch; alcohols such as $R_F$—$(CH_2)_x$OH wherein $R_F$ is defined above; esters such as $R_F$—COOR wherein $R_F$ is defined above and R is a hydrocarbon, a fluorinated alkyl, or an aromatic substituent; fluorinated vinylethers such as $R_F$—O—CX=CX$_2$ wherein $R_F$ is defined above and X is independently selected from H, Cl, and F; fluorinated monomers such as $R_F$—O—$(CH_2)_z$—CX=CX$_2$, $R_F$—OOC—CH=CH$_2$, and $R_F$—CX=CX$_2$ wherein $R_F$ and X are defined above; fluorinated oligomers such as $Y(TFE)_o(HFP)_p(CF_2)_q(\text{Vinylether})_r(CF_2)$—$(C_2)$—W wherein Y is carboxylic, sulfonic acid, sulfates, or H and W is selected from COO$^-$, OSO$_3^-$, SO$_3^-$, and OH— and o, p and q are independently selected from 1-10; and inert fluorinated liquids such as $(R_F)_3N$, and $R_F$—O—R'$_F$ wherein $R_F$ is defined above and R'$_F$ is a fluorinated alkyl chain with or without heteroatoms, optionally containing further functional groups. The fluorine containing compounds suitable for degradation may also contain additional Cl, Br, or I atoms.

Additional fluoroorganic compounds suitable for degradation include chain transfer agents, which are Br and/or I-containing fluorinated compounds, such as X—$R_f$—X where X is independently selected from Br and I and $R_f$ is a fluorinated alkyl group). Exemplary compounds include: $CF_2Br_2$, $CF_2BrI$, $CF_2I_2$, $ICF_2$—$CF_2I$, $BrCF_2$—$CF_2I$, $I(CF_2)_nI$, and $CF_3$—$(CF_2)_nI$ where n is 3 to 10. An additional fluoroorganic compound suitable for degradation include ketones, such as $CF_3$—$C(O)$—$CF_3$ resulting from the synthesis of hexafluoropropylene oxide.

Additional fluoroorganic compounds suitable for degradation include low molecular weight fluoroorganic compounds that have anionic end groups resulting from a fluoropolymer polymerization, such as those described above. Examples of such anionic end groups include carboxylic acids, sulphonic acids and sulfuric acids including salts of these acids. The molecular weight and amount of these low molecular weight fluoroorganic compounds will generally vary with the conditions of the polymerization. The structure of the low molecular weight fluoroorganic compounds will depend on for example the monomers being polymerized, polymerization conditions as well as the particular initiator system and/or chain transfer agents being used. In general, the low molecular weight fluoroorganic compounds that may form will be compounds that have one or two ionic groups. Typically such ionic groups include carboxylic acids, sulphonic acids, sulfuric acids as well as salts of such acids. The low molecular weight fluoroorganic compounds will generally further comprise units deriving from the monomers involved in the polymerization. A variety of combination of such units may be found in the low molecular weight fluoroorganic compounds.

In another embodiment, low molecular weight fluoroorganic compounds that may be degraded include; liquid and fluorinated hydrocarbon compounds that are used during polymerization processes, for example inert fluorinated liquids, such as a fluorinated alkyl amine, a fluorinated polyether, and a fluorinated alkyl.

These fluorinated hydrocarbon compounds may be present in the aqueous coagulation phases or in filtrates from up-concentrations, typically comprise between 3 and 25 carbon atoms, preferably between 5 and 20 carbon atoms and may contain up to 2 heteroatoms selected from oxygen, sulfur or nitrogen. Suitable fluorinated hydrocarbons include fluorinated saturated linear, branched and/or cyclic aliphatic compounds such as a fluorinated linear, branched or cyclic alkane; a fluorinated aromatic compound such as perfluorinated benzene, or perfluorinated tetradecahydro phenanthene. It can also be a fluorinated alkyl amine such as a fluorinated trialkyl amine. It can further be a fluorinated cyclic aliphatic, such as decalin; and preferably a heterocyclic aliphatic compound containing oxygen or sulfur in the ring, such as perfluoro-2-butyl tetrahydrofuran.

Specific examples of fluorinated hydrocarbons include perfluoro-2-butyltetrahydrofuran, perfluorodecalin, perfluoromethyldecalin, perfluoromethylcyclohexane, perfluoro(1,3-dimethylcyclohexane), perfluorodimethyldecahydronaphthalene, perfluorofluorene, perfluoro(tetradecahydrophenanthrene), perfluorotetracosane, perfluorokerosenes, octafluoronaphthalene, oligomers of poly(chlorotrifluoroethylene), perfluoro(trialkylamine) such as perfluoro(tripropylamine), perfluoro(tributylamine), or perfluoro(tripentylamine), and octafluorotoluene, hexafluorobenzene, and commercial fluorinated solvents, such as Fluorinert FC-75, FC-72, FC-84, FC-77, FC-40, FC-43, FC-70, FC 5312 or FZ 348 all produced by 3M Company. A suitable inert liquid and highly fluorinated hydrocarbon compound is $C_3F_7$—O—$CF(CF_3)$—$CF_2$—O—CHF—$CF_3$ and $C_3F_7$—[O—$CF(CF_3)$—$CF_2]_n$—O—CHF—$CF_3$ wherein n is 2 to 10.

Because the radical generating process occurs in an aqueous environment, the solubility of the fluoroorganic compounds suitable for degradation in water at 25° C. is at least 0.1 ppm, 1 ppm, 2 ppm, 5 ppm, 10 ppm, 25 ppm, or even 50 ppm.

The molecular weight of these low molecular weight fluoroorganic compounds that may be removed from the reaction product or the aqueous phase is usually less than 5000, 2500, 2000, 1500, 1000, 500, or even 350 g/mol.

Extractions

In one embodiment, the coagulated or non-coagulated reaction product or the aqueous phase of the reaction product may be extracted using water forming an aqueous phase, to remove the undesirable low molecular weight fluoroorganic compounds. In another embodiment, the reaction product may be purified by steam distillation, which is then condensed into an aqueous phase. In some embodiments, the aqueous phase may be treated via ion-exchange to concentrate the undesirable low molecular weight fluoroorganic compounds. The ion-exchange process comprises the use of a separate water treatment with a separate anion-exchanger and a separate cation-exchanger; alternatively a mixed ion-exchanger process might be used. However treatment of the aqueous phase using anion-ion exchange introduces di- and tri-alkyl amines into the resulting product.

If a fluoropolymer dispersion or a coagulated fluoropolymer dispersion is contacted with an anion exchange resin, di- and tri-alkylamines may be present in the fluoropolymer and can change the physical properties of the resulting fluoropolymer or reaction product. However, it is further believed that in one embodiment, these di- and tri-alkyl amines may be degraded during the radical forming process. Exemplary di- and tri-alkyl amines, for example, $R_2NH$ or $R_3N$, wherein R is idependently selected from an alkyl group, optionally comprises a functional group, for example a hydroxyl group. Examples of R groups include: $CH_3$(—$CH_2)_n$— or $CH_2OH$(—$CH_2)_n$— where n is 0 to 3. Exemplary di- and tri-alkyl amines include, $[CH_3$(—$CH_2)_2][CH_3$(—$CH_2)_3]NH$, $(CH_3)_2NH$, and $(CH_3)_3N$.

Remove Fluorine Ions and Cations

Because the radical generating process can degrade the fluoroorganic compounds into among other things, F— and cations, these ions may be removed via a precipitation process to preclean the sample. Exemplary precipitation processes to remove fluorine ions include contact with a calcium salt or hydroxy-apatit, which will form an insoluble precipitate with the fluorine ions. Similarly, other salts may be selectively added to form insoluble precipitates with the cations that may be present.

Purified Water

By using the process as described herein, namely the treatment of a reaction product using a radical-generating process and ion-exchange, followed by a precipitation step, typically results in providing water with low ion levels and total organic fluoride content-levels below 1000, or even 500 ppm. The recovered water will typically have a purity sufficient to allow use of the water in subsequent synthesis or processes. For example, this water may be recycled back into the process, either as a starting material for a subsequent reaction or for extracting desirable compounds into an aqueous phase.

Purified Product

By using the methods as described herein purified products may be achieved. In one embodiment, the reaction product is substantially free of metal ions (i.e., less than 500, 100, or even 50 ppm). Alternatively or additionally, the reaction product is substantially free of di- and tri-alkyl amines (i.e., less than 500, 250, 100, or even 50 ppm). Further, a dispersion is obtained that is substantially free of fluoroorganic compounds having one or more polar and/or reactive groups and having a low molecular weight, in other words a molecular weight of 3000, 2000, 1500, 1000, 500, 300, or even 150 g/mol or less. By substantially free is meant that the total amount of these low molecular weight fluoroorganic compounds are absent or, if present, present in an amount of not more than 500 ppm based on the amount of solids, generally in an amount of less than 100 ppm.

By removing low molecular weight fluoroorganic compounds that have one or more polar or reactive groups, a fluoropolymer can be obtained that may provide improved properties or meet other specifications for purity. For example, when the amount of ionic groups in the fluoropolymer product per unit mass is large, the melt processing of the fluoropolymer may be negatively influenced and/or the fluoropolymer may not have the desired degree of purity for particular applications. This may be particularly useful if the fluoropolymer is used to make fluoroelastomers which are being used in semi-conductor applications or in fuel management systems.

In one embodiment, the present disclosure advantageously provides a total treatment system, wherein the low molecular weight fluoroorganic compounds are not only removed from the desired fluorinated composition, but decomposed into their constituent species such as carbon dioxide, fluoride ion and simple sulfates.

The reaction products obtained may be used to coat substrates such as fabrics, metal surfaces, glass, and plastic surfaces.

Some embodiments of the present disclosure include:

Embodiment 1. A composition comprising: an aqueous polymerization reaction product of fluorinated monomers and wherein the polymerization is initiated (i) in the absence of a fluorinated emulsifier and whereby no fluorinated emulsifier is added during polymerization or (ii) in the presence of an fluorinated emulsifier selected from:

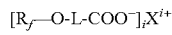
$[R_f\text{—O-L-COO}^-]_iX^{i+}$ wherein L represents a linear or branched, non-fluorinated, partially fluorinated, or fully fluorinated alkylene group, $R_f$ represents a linear or branched partially or fully fluorinated aliphatic group or a linear or branched partially or fully fluorinated aliphatic group interrupted with at least one oxygen atom, $X^{i+}$ represents a cation having the valence i and i is 1, 2 or 3;
wherein the reaction product and/or the resulting aqueous phase are substantially free of di- and tri-alkylamines and substantially free of low molecular weight fluoroorganic compounds.

Embodiment 2. The composition of embodiment 1, wherein the aqueous polymerization reaction product is a fluoropolymer latex comprising a solid content of at least 0.0001% by weight.

Embodiment 3. The composition of embodiment 1, wherein the aqueous polymerization reaction product is a coagulated polymer.

Embodiment 4. The composition of any one of the previous embodiments, wherein the fluorinated emulsifier is partially fluorinated.

Embodiment 5. The composition of any one of embodiments 1-4, wherein the fluorinated emulsifier is selected from at least one of: $CF_3O(CF_2)_{1-4}OCFHCF_2COOX$; $HCF_2O(CF_2)_{1-3}OCHFCF_2$—COOX, $C_3F_7OCF(CF_3)$ COOX, $CF_3CFHO(CF_2)_{1-4}OCHFCF_2COOX$, and $CF_3O(CF_2)_3OCF_2COOX$; $F(CF_2)_nO(CF_2CF_2O)_mCF_2$ COOX where n is 1 to 5 and m is 0 to 5 and where X is a cation.

Embodiment 6. The composition of any one of the previous embodiments wherein the fluorinated monomer is selected from: tetrafluoroethylene, hexafluoropropylene, vinylidene fluoride, perfluorinated alkyl vinyl ether, perfluorinated alkoxyalkyl vinyl ether, perfluorinated alkenyl vinyl ether, or perfluorinated alkoxyalkenyl vinyl ether, $CF_2$=$CFOCF_2(CF_2)_3CF_2CN$, $CF_2$=$CFOCF_2CF(CF_3)$ $OCF_2CF_2CN$, $CF_2$=$CFOCF_2CF_2Br$, $CF_2$=$CFOCF_2CF_2CF_2Br$, and $CF_2$=$CFOCF_2CF_2CF_2OCF_2CF_2Br$.

Embodiment 7. The composition of any one of the previous embodiments wherein the reaction product is substantially free of metal ions.

Embodiment 8. A method of purifying a product comprising the following steps (i) providing a crude product comprising at least one low molecular weight fluoroorganic compounds wherein the low molecular weight fluoroorganic compound is fluorinated and comprises a polar group and/or a reactive group; (ii) extracting the low molecular weight fluoroorganic compound from the product using water to form an extract; (iii) contacting the extract with a radical-forming process to degrade the low molecular weight fluoroorganic compounds into carbon dioxide, water, fluorine ions, and optionally cations; (iv) optionally, removing the fluorine ions and cations; and (v) optionally using the water from step (iii) in step (ii).

Embodiment 9. The method of embodiment 8 wherein the fluorine ions are removed via a precipitation process or an ion exchange process.

Embodiment 10. The method of any one of embodiments 8-9, wherein the polar group is selected from at least one of: an ether, an ester, and an acid.

Embodiment 11. The method of any one of embodiments 8-9, wherein the reactive group is selected from at least one of: an olefin, a halide, and an alkyl group comprising at least one of a bromine or iodine atom.

Embodiment 12. The method of any one of embodiments 8-9, wherein the low molecular weight fluoroorganic compound is an inert fluorinated liquid.

Embodiment 13. The method of any one of embodiments 8-12, wherein the crude product is a fluoropolymer latex or a coagulated fluoropolymer.

Embodiment 14. The method of embodiment 13, wherein the fluoropolymer is selected from at least one of: semi-crystalline fluoropolymers, semi-crystalline fluorothermoplasts, amorphous fluoropolymers, and combinations thereof.

Embodiment 15. The method of any one of embodiments 8-14, wherein the crude product is derived from a fluorinated compound synthesis.

Embodiment 16. The method of any one of embodiments 8-15, further comprising adding a base before extracting the low molecular weight fluoroorganic compound from the product.

Embodiment 17. The method of any one of embodiments 8-16, wherein the radical forming process is an electrochemical process.

Embodiment 18. The method of embodiment 17, wherein the electrochemical process comprises a hydroxy radical-generating electrode.

Embodiment 19. The method of embodiment 18, wherein the hydroxy radical-generating electrode is selected from a boron doped diamond coated electrode, a lead oxide electrode, or a diamond particle electrode doped with boron.

Embodiment 20. The method of embodiment 19, wherein the boron of the boron doped diamond coated electrode is doped at 0.05 ppm to 10000 ppm.

Embodiment 21. The method of any one of embodiments 8-20, wherein the potential used in the electrochemical process is 3 to 15 volts.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; St. Louis, Mo., or known to those skilled in the art unless otherwise stated or apparent.

These abbreviations are used in the following examples: g=gram, kg=kilograms, mg=milligrams, min=minutes, mol=mole; cm=centimeter, mm=millimeter, ml=milliliter, L=liter, mS=millisiemens, μS=microsiemens, MPa=megaPascals, and wt=weight.

Methods

Fluoride Content

Soluable inorganic fluoride was quantified using Method DIN 38405-D4 "German Standard Methods for the Analysis of Water, Waste Water and Sludge; Anions (Group D); Measurement of Fluoride") and total fluoride was analyzed using Wickbold pulping and Ion Chromatography. The total organic fluoride content (TOF) in the samples was calculated as difference between total and inorganic fluoride: $c(F_{organic}^-)=c(F_{total}^-)-c(F_{inorganic}^-)$. $CF_3O(CF_2)_3OCHFCF_2COO^-$, $CF_3OCF_2CF_2COO^-$ and perfluoropentanoic acid ($C_4F_9COO^-$) Content 1 ml sample is spiked with internal standard and esterified with boron trifluoride ($BF_3$)/methanol agent. The mixture is agitated at elevated temperature for 30 minutes and the produced esters of $CF_3$—O—$(CF_2)_3$—O—CHF—$CF_2$—COOH, $CF_3$—O—CF2CF2-COOH and $C_4F_9$COOH are then quantified by headspace gas chromatography (GC) coupled with Mass Spectrometry (MS). The limit of detection is 1 ppm.

Residual Vinyl Ether Monomer Content:

Residual monomers PPVE and MV31 were analyzed as follows: 2 ml sample are weighed in a 20 ml headspace vial, sealed and heated to 70° C. for 2 hours. 1000 μl of the gas phase is injected into headspace GC equipped with flame ionization detection and analyzed for the monomers perfluoro propylvinyl ether (PPVE) and perfluoro-3-methoxy-1-propylvinyl ether (MV31). The limit of detection is ≤0.01 ppm Conductivity Conductivity was measured according to DIN-EN 27888 "Water Quality: Determination of Electroconductivity" with a Conductometer Type 712 from Metrohm Schweiz AG, Zofingen, Switzerland at 20° C.

Solid content: Solid content can be determined thermogravimetrically. The amount of solids expressed herein is assumed to be polymer content and is not corrected for other non-volatiles.

Example 1

A 3100 mg/L aqueous solution of $CF_3$—O—$(CF_2)_3$—O—CHF—$CF_2$—COO$^-$ $NH_4^+$ (prepared as described in U.S. Publ. No. 2007-0025902: Compound 11) was obtained from coagulating of a fluoropolymer latex with a homogenizer. 1 L of this aqueous solution of $CF_3$—O—$(CF_2)_3$—O—CHF—$CF_2$—COO$^-NH_4^+$ (pH=2,7 conductivity ~5 mS/cm) was electrolyzed in a beaker at 20 to 27° C. The anode was a 200 cm$^2$ Niobium electrode coated with Boron-doped diamond layer available from Condias GmbH—Germany. The cathode was a boron-doped diamond electrode. Shown in Table 1 are the conditions used in the electrolysis.

The degradation of $CF_3$—O—$(CF_2)_3$—O—CHF—$CF_2$—COO$^-$ via $CF_3$—O—$CF_2$—$CF_2$—COO$^-$ (OPA) into F$^-$ was monitored by GC-MS and the results are shown in Table 1.

TABLE 1

| Time | Electric Current | Voltage | Concentration (mg/g) | |
|---|---|---|---|---|
| (hours) | (Amps) | (Volts) | $CF_3O(CF_2)_3OCHFCF_2COO-$ | OPA |
| 0 | 0.2 | 2.8 | 3100 | 0 |
| 2.7 | 0.2 | 4.7 | 1700 | 190 |
| 8.3 | 0.2 | 4.7 | 120 | 410 |
| 16.7 | 0.2 | 4.5 | 14 | 140 |
| 21.2 | 0.2 | 4.6 | 7 | 70 |

Example 2

1 L of an aqueous solution containing 500 mg/L of $CF_3$—O—$(CF_2)_3$—O—CHF—$CF_2$—COONH$_4^+$, 100 ppm of a non-ionic alkylphenol ethoxylate available under the trade designation "TRITON X 100" available from Dow Chemical Co., Midland, Mich., and 100 ppm of an ethoxylated isotridecanol available under the trade designation "GENAPOL" available from Clariant SE, Germany, was electrolyzed as described in Example 1. The aqueous solution was obtained by up-concentrating a fluoropolymer latex via ultrafiltration. Shown in Table 2 are the conditions used in the electrolysis.

The degradation of ($CF_3$—O—$(CF_2)_3$—O—CHF—$CF_2$—COO$^-$ via OPA into F$^-$ was monitored by GC-MS and the results are shown in Table 2.

TABLE 2

| Time | Current | Potential | Concentration (mg/g) | |
|---|---|---|---|---|
| (hours) | (Amps) | (Volts) | $CF_3O(CF_2)_3OCHFCF_2COO^-$ | OPA |
| 0 | 0.2 | 3.8 | 500 | 0 |
| 3 | 0.2 | 4.8 | 130 | 90 |
| 5.3 | 0.2 | 4.5 | 20 | 45 |
| 14.3 | 0.2 | 4.3 | <1 | <1 |

Example 3

A crude synthesis of PPVE ($C_3F_7$—O—CF=$CF_2$) was extracted with water. The extracted aqueous phase had a pH=2.5 and conductivity 3 mS/cm and contained about 200 mg PPVE/L water, perfluoropentanoic acid, and some other fluorinated ionic species. The extracted aqueous phase was electrolyzed in a closed cylinder with a stack comprising two diamond anodes and three diamond cathodes (electrode area 200 cm$^2$) at 25 to 40° C. The degradation of PPVE via TOF and perfluoropentanoic acid was monitored via GC-MS. After 34 hours of electrolysis, no PPVE was detectable. Shown in Table 3 are the conditions and the results.

TABLE 3

| | | | Concentration | | |
|---|---|---|---|---|---|
| Time (hours) | Current (Amps) | Potential (Volts) | Perfluoropentanoic acid (μg/g) | TOF (mg/L) | F-(mg/L) |
| 0 | 15 | 8.7 | 1200 | 2000 | 200 |
| 2 | 7.5 | 7.2 | 16 | nm | nm |

TABLE 3-continued

| Time (hours) | Current (Amps) | Potential (Volts) | Concentration | | |
|---|---|---|---|---|---|
| | | | Perfluoropentanoic acid (µg/g) | TOF (mg/L) | F-(mg/L) |
| 16 | 7.5 | 7.2 | <1 | 200 | 1500 |
| 34 | 7.0 | 8.7 | <1 | 100 | 1400 | nm is not measured

TABLE 5

| | | pH | F-(mg/L) | Conductivity |
|---|---|---|---|---|
| Example 5 | Initial | 1.8 | 1400 | 6.6 mS/cm |
| | after anion-exchange | 10.3 | 10 | 130 µS/cm |
| | after cation-exchange | 4.0 | 10 | 200 µS/cm |
| Example 6 | Initial | 1.3 | 9000 | 30 mS/cm |
| | after anion-exchange | 10.2 | 80 | 600 µS/cm |
| | after cation-exchange | 3.5 | 80 | 1.0 mS/cm |

Example 4

A crude reaction product of $CF_3$—O—$(CF_2)_3$—O—CF=CF was extracted with water. The extracted aqueous phase had a pH=2.5 and contained about 600 mg of vinylether/L water and $CF_3$—O—$CF_2$—$CF_2$—COOH. The extracted aqueous phase was electrolyzed according to Example 3. The degradation of $CF_3$—O—$(CF_2)_3$—O—CF=$CF_2$ and OPA was monitored by GC-MS. After 30 hours of electrolysis, no vinyl ether was detectable. Shown in Table 4 are the conditions used in the electrolysis and the results including TOF and $F^-$-measurements.

TABLE 4

| Time (hours) | Current (Amps) | Potential (Volts) | Concentration | | |
|---|---|---|---|---|---|
| | | | OPA (µg/g) | TOF (mg/L) | F-(mg/L) |
| 0 | 9.5 | 7.8 | 23000 | 14000 | 1000 |
| 2 | 1.0 | 4.0 | 3000 | nm | nm |
| 16 | 1.0 | 4.1 | <1 | 1700 | 9000 |
| 30 | 1.0 | 4.2 | <1 | 500 | 9800 | nm is not measured

Note: the differences of TOF/$F^-$ between the start of the process and the end of the process in Table 4 may be due to precipitation of fluoride salts.

Example 5

500 g of the electrolyzed sample after 34 h from Example 3 was treated and agitated with 200 mL of an anion-exchange resin (Amberlite IRA-402 OH available from Rohm and Haas) at room temperature for 6 hours. The resin was then removed and 200 g of the treated sample was agitated with 50 g of cation-exchange resin (Dowex MNO sphere 650 C (H) available from Dow Chemical) for 3 hours. The resin was removed and the ion-exchanged sample was analyzed for pH, F— concentration and conductivity. The results are in Table 5.

Example 6

500 g of the electrolyzed sample after 30 h from Example 4 was treated with 200 mL of an anion-exchange resin (Amberlite IRA-402 OH available from Sigma-Aldrich) at room temperature for 6 hours. The resin was then removed and 200 g of the treated sample was agitated with 50 g of cation-exchange resin (Dowex MNO sphere 650 C (H) available from Dow Chemical) for 3 hours. The resin was removed and the ion-exchanged sample was analyzed for pH, F— concentration and conductivity. The results are in Table 5.

Example 7

1L of a diluted aqueous latex of a fluoropolymer (TFE 20 mol %, VDF 59 mol %, and CF2=CF—O—(CF2)3-O—CF3 21 mol %) having a solid content of 0.1 wt % was electrolyzed at 30° C. 3 g of $Na_2SO_4$ was added to the latex prior electrolyzing and the latex contained 90 µg/g of $CF_3$—O—$(CF_2)_3$—O—CHF—$CF_2COO^-$ as an emulsifier. The electrolysis was conducted using an anode of a 100 cm² Niobium electrode coated with a Boron-doped diamond layer from Condias GmbH. The voltage/potential used was 16.4 V and the current was between 3.5-4.5 Amps. After 100 min of electrolyzing, the content of the $CF_3$—O—$(CF_2)_3$—O—CHF—$CF_2COO^-$ was reduced to 50 µg/g.

Foreseeable modifications and alterations of this invention will be apparent to those skilled in the art without departing from the scope and spirit of this invention. This invention should not be restricted to the embodiments that are set forth in this application for illustrative purposes.

The invention claimed is:

1. A method of purifying a product comprising the following steps
   (i) providing a fluoropolymer latex substantially free of a fluorinated emulsifier, wherein the fluoropolymer latex comprises at least 0.1% by weight solids and at least one low molecular weight fluoroorganic compound wherein the low molecular weight fluoroorganic compound is fluorinated and comprises a polar group and/or a reactive group;
   (ii) contacting the fluoropolymer latex with a radical-forming process to degrade the at least one low molecular weight fluoroorganic compound into carbon dioxide, water, fluorine ions, and optionally cations; and
   (iii) optionally, removing the fluorine ions and cations.

2. The method of claim 1, wherein the low molecular weight fluoroorganic compound is an inert fluorinated liquid.

3. The method of claim 1, wherein the radical forming process is an electrochemical process.

4. The method of claim 3, wherein the electrochemical process comprises a hydroxy radical-generating electrode.

5. The method of claim 4, wherein the hydroxy radical-generating electrode is selected from a boron doped diamond coated electrode, a lead oxide electrode, or a diamond particle electrode doped with boron.

6. The method of claim 5, wherein the boron of the boron doped diamond coated electrode is doped at 0.05 ppm to 10000 ppm.

7. The method of claim 1, wherein the potential used in the electrochemical process is 3 to 15 volts.

8. The method of claim 1, further comprising removing the fluorine ions and cations, wherein the fluorine ions are removed via a precipitation process or an ion exchange process.

9. The method of claim 1, wherein the low molecular weight fluoroorganic compound comprises a reactive group and the reactive group is selected from at least one of: an olefin, a halide, and an alkyl group comprising at least one of a bromine or iodine atom.

10. The method of claim 1, wherein the fluoropolymer latex comprises at least 1% by weight solids.

11. The method of claim 1, wherein the fluoropolymer latex comprises at least 10% by weight solids.

12. The method of claim 1, wherein the polar group is selected from at least one of: an ether, an ester, and an acid.

13. A method of purifying a product comprising the following steps
   (i) providing a fluoropolymer latex substantially free of a fluorinated emulsifier, wherein the fluoropolymer latex comprises at least 0.1% by weight solids and at least one low molecular weight fluoroorganic compound wherein the low molecular weight fluoroorganic compound is fluorinated and comprises a polar group and/or a reactive group;
   (ii) contacting the fluoropolymer latex with a radical-forming process to degrade the at least one low molecular weight fluoroorganic compound into carbon dioxide, water, fluorine ions, and optionally cations; and
   (iii) removing the fluorine ions and cations via a precipitation process or an ion exchange process.

14. The method of claim 13, wherein the polar group is selected from at least one of: an ether, an ester, and an acid.

15. The method of claim 13, wherein the low molecular weight fluoroorganic compound is an inert fluorinated liquid.

16. The method of claim 13, wherein the radical forming process is an electrochemical process.

17. The method of claim 16, wherein the electrochemical process comprises a hydroxy radical-generating electrode is selected from a boron doped diamond coated electrode, a lead oxide electrode, or a diamond particle electrode doped with boron.

18. The method of claim 13, wherein the low molecular weight fluoroorganic compound comprises a reactive group and the reactive group is selected from at least one of: an olefin, a halide, and an alkyl group comprising at least one of a bromine or iodine atom.

19. The method of claim 13, wherein the low molecular weight fluoroorganic compound is a fluorinated emulsifier.

20. The method of claim 13, wherein the fluoropolymer latex comprises at least 1% by weight solids.

* * * * *

UNITED STATES PATENT AND TRADEMARK OFFICE
CERTIFICATE OF CORRECTION

PATENT NO. : 9,453,086 B2
APPLICATION NO. : 13/995615
DATED : September 27, 2016
INVENTOR(S) : Hintzer et al.

Page 1 of 1

It is certified that error appears in the above-identified patent and that said Letters Patent is hereby corrected as shown below:

In the Specification

Column 7,
Line 45, after "$Ca^{+2}$," insert -- $K^+$, --.

Column 9,
Line 60, delete "$CF_3$wherein" and insert -- $CF_3$ wherein --, therefor.

Column 11,
Line 32, delete "$COO^-]_i X^{i+}$" and insert -- $COO^-]_i\ X^{i+}$ --, therefor.
Line 58, delete ")$_{1-3}$" and insert -- )$_{1-4}$ --, therefor.

Column 14,
Line 20, delete "—$COONH_4^+$," and insert -- —$COO^-NH_4^+$, --, therefor.

Column 16,
Line 14, delete "CF2=CF" and insert -- CF2=CF --, therefor.

Signed and Sealed this
Seventh Day of February, 2017

Michelle K. Lee
*Director of the United States Patent and Trademark Office*